Feb. 12, 1946.  G. I. LAVOIE  2,394,789
BAND SAW
Filed Sept. 22, 1943   2 Sheets-Sheet 1

INVENTOR
GEORGES I. LAVOIE
BY
Beau, Brooks, Buckley & Beau.
ATTORNEYS

Feb. 12, 1946.    G. I. LAVOIE    2,394,789
BAND SAW
Filed Sept. 22, 1943    2 Sheets-Sheet 2
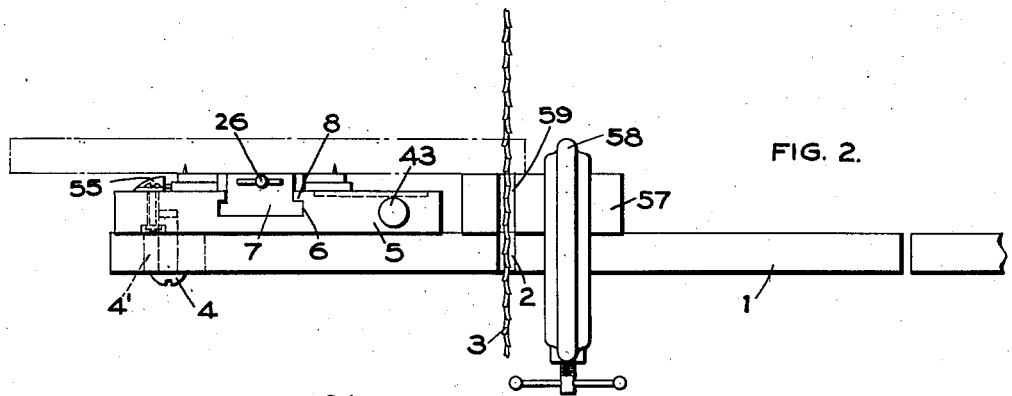
FIG. 2.
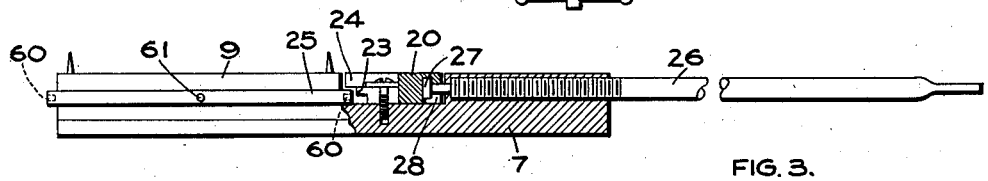
FIG. 3.
FIG. 5.
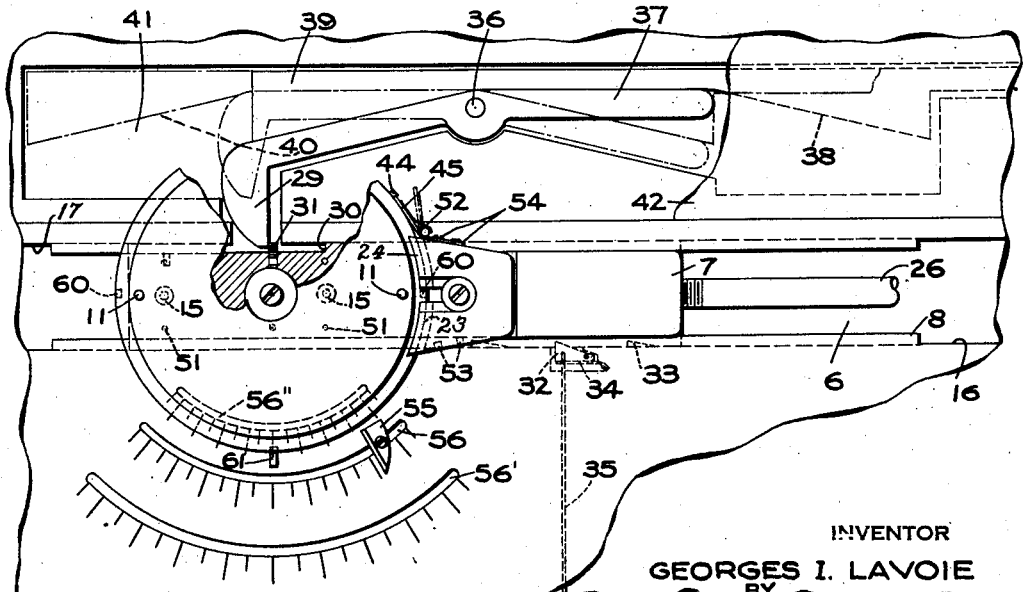
INVENTOR
GEORGES I. LAVOIE
BY
Beau, Brooks, Buckley & Beau
ATTORNEYS Patented Feb. 12, 1946

2,394,789

UNITED STATES PATENT OFFICE 2,394,789

BAND SAW

Georges I. Lavoie, Buffalo, N. Y.

Application September 22, 1943, Serial No. 503,351

15 Claims. (Cl. 143—26)

This invention relates to a band saw fixture and more particularly to a table attachment for supporting and guiding the work during sawing operation.

In feeding the work to a band saw, an experienced hand is required in order to guide the work for producing the desired configuration, and especially is this necessary in sawing a design which incorporates a circular or arcuate line which begins or ends with a tangentially extending surface.

The object of the present invention is to provide a machine of this character by which configurations, utilizing contiguous arcuate, and straight lines, may be readily cut and duplicated with the greatest facility. The invention further has for its object to provide a work supporting table for a band saw which is of simple construction and is practical and efficient in operation, and further to provide a worktable in the nature of an attachment to the bed of a saw machine whereby to increase the utility of the latter.

In the drawings

Fig. 2 is a front elevation thereof;

Fig. 3 is an elevation of the worktable unit, with portions shown in section;

Fig. 5 is an enlarged detailed view, in plan and with portions broken away, illustrating more particularly the means for centering the worktable with respect to the band saw.

Figure 1:
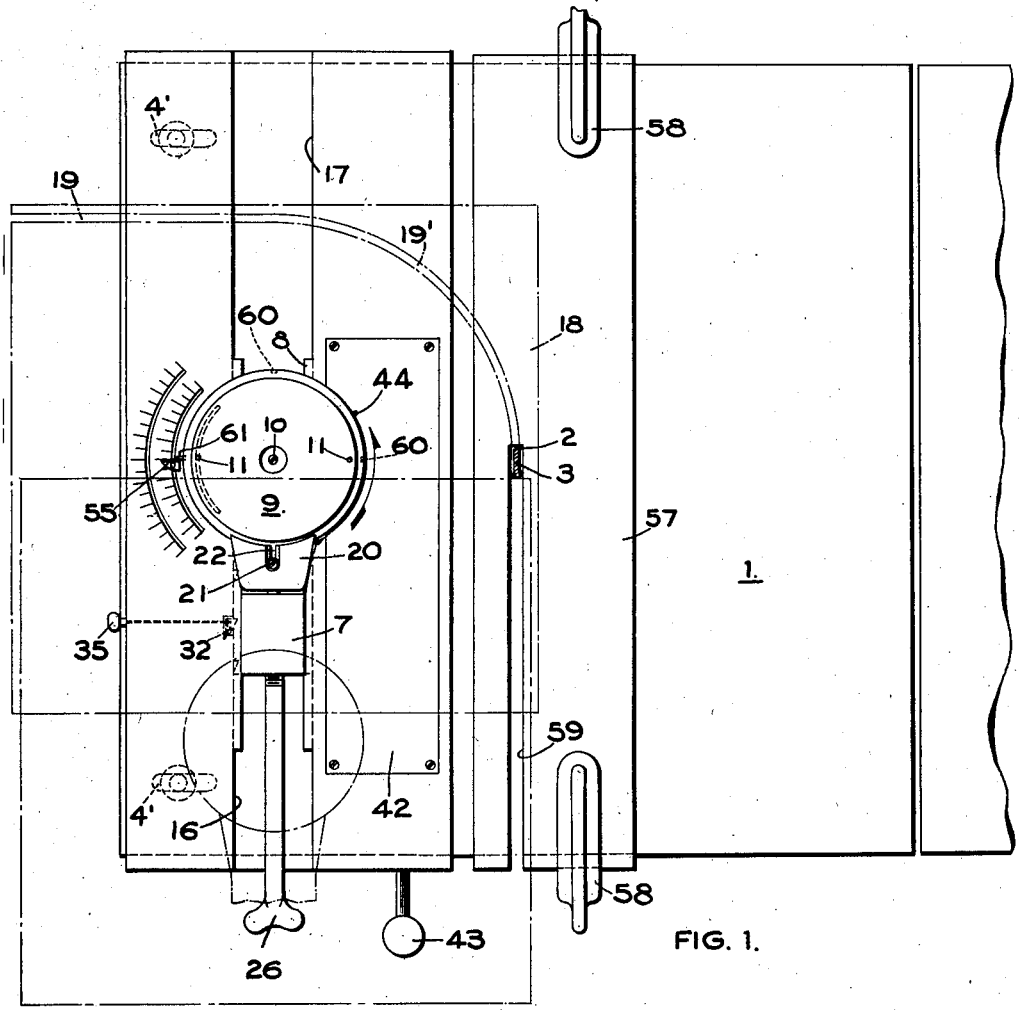
Fig. 1 is a fragmentary plan view of the bed of a band saw constructed in accordance with the present invention.

Referring more particularly to the drawing, the numeral 1 indicates the bed of a band saw machine having an opening 2 through which the saw band 3 moves in a vertical path from one to the other of its supporting wheels (not shown).

Fixed to the bed as a permanent part thereof, or by means of fasteners 4 as an attachment thereto, is a bed frame member 5 have a guideway 6 extending fore and aft across the bed for receiving the worktable unit. According to the illustrated embodiment of the invention, this unit comprises a supporting body 7 which slidably seats beneath flanges 8 overhanging from the sides of the way 6. A rotatable worktable 9 is pivotally mounted by a fastener 10 on the slide or support 7 and this table may be provided with upstanding work engaging prongs 11 or other suitable fastening means. The mounting fastener 10, herein shown as a screw, is received within a central socket 12 and provided with a retaining washer 13 which overhangs an inner circular flange 14 on the worktable to secure the latter in position on the slide against tilting, the screw having a shoulder abutting a shoulder in a counterbore 15 in the slide to preclude any frictional binding on the table against free rotation of the latter. The overhanging ribs 8 on the side walls of the way 6 may terminate short of the way to provide an entrance opening 16 and a demounting opening 17 for the worktable unit as shown clearly in Figs. 1 and 5.

Means are provided to define the rotative adjustment of the worktable separate and distinct from the rectilineal or sliding adjustment when a clear line of demarcation is required therebetween. With the placement of the worktable unit through the entrance opening 16 into the guideway 6 and the mounting of the workpiece, such as is indicated by the broken line 18, on the impaling prongs 11, the work is fed into the saw by sliding the table support 7 along the way cutting, for example, the kerf 19. During the sliding movement of the unit, the worktable is held locked against rotative movement as by means of a clutch shoe 20 which is slidably secured to the support 7 by the pin 21 working in a slot 22. This shoe may have an arcuate table-engaging face 23 with an overhanging lip 24, Fig. 3, cooperating with a peripheral shoulder 25 on the table 9 to give support thereto against tilting during rotative adjustment. The clutch shoe 20 is moved radially with respect to the worktable by means of an adjusting screw 26 which has a coupling head 27 received within a seat 28 in the clutch shoe to provide swivel connection therewith while enabling ready dismantling of the connected parts.

By turning the clamp screw 26 inwardly, the shoe face 23 will engage the table and secure the same against rotation. Thus locked, the worktable is prevented from turning during the cutting of a straight slot. Where this slot is to merge into a curve design, the table unit is arrested at a point directly opposite the saw 3. This arresting action is accomplished herein by a latch 29 which is projectible into the path of a shoulder on the unit and which may be either a fixed part 30 of the slide 7 or an adjustable part such as is provided by the screw 31, the latter being turned down out of the way of the latch when not desired. In its arrested position the unit is secured by a catch 32 engaging in a seat 33 for holding the unit against retrograde movement. The catch, projected by a leaf spring 34, may be withdrawn by a member 35. The clutch shoe 20 is then backed away from the worktable to permit the same being turned about its axis 13 for producing a concentric continuation of the kerf 19, such as is indicated at 19'. The curved slot may be a complete circle or a portion thereof, and after completing the arcuate cut, the worktable is again locked by the clutch shoe 20 and the unit released by withdrawing the latch 29 and the catch 32 after which the unit is moved along the guideway 6 until the saw has cut through the edge of the workpiece. The workpiece is then lifted from the prongs 11 and, if desired, the unit may be removed through the displacement opening 17.

The latch 29 is pivotally mounted at 36 and formed with an angular extension 37 adapted to ride upon a cam face 38 of a control slide 39, which latter has a second cam face 40 cooperating with the latch 29 to support the latter against free pivotal movement and to provide a controlled projection and withdrawal of the latch to and from the path of the stop shoulder 30 (31). The control slide 39 is slidable within a latch chamber 41 to which access may be gained by removal of the cover plate 42, the control slide having a handle 43 extending adjacent the clamp screw 26 for being readily accessible at the front of the band saw machine. By sliding the handle 43 out or in, the arresting latch will be projected or withdrawn accordingly.

Figure 4:
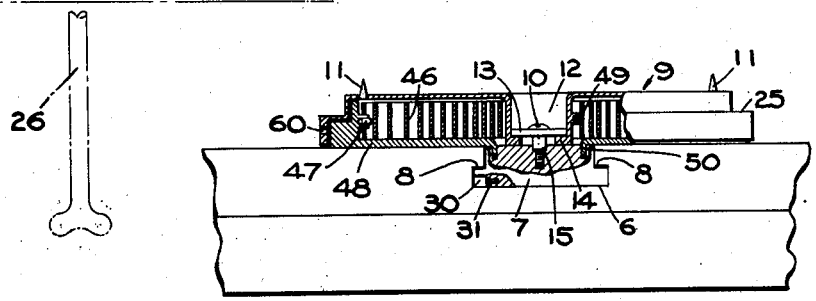
Fig. 4 is a transverse sectional view through the worktable unit in position on the saw machine bed, with portions shown in elevation.

In order to restore the worktable automatically to its normal starting position, as determined by a table-carried pin 44 engaging a stop 45, a convolute spring 46 is arranged within a chamber of the turn table, as shown in Fig. 4, one end of the spring being anchored at 47 to a base section 48, while the opposite spring terminal is secured to a lug 49 on the worktable. The base section 48 is provided with depending lugs 50 for detachable engagement in recesses 51 provided in the upper face of the slide 7. By simply removing the retaining screw 10, the entire worktable, including its base section 48 and the enclosed spring 46, may be lifted from the slide, the clutch shoe 20 being so disposed as to withdraw the overhanging lip 24. Upon replacement of the worktable on the slide the spring may be wound to the desired tension by simply rotating the table on its base the desired number of turns, for which purpose the stop 45 is yieldably mounted as by means of the spring hinge 52, Fig. 5. If need be, the table spring 46 may be reversed within its chamber by engaging the spring terminals in the opposite sides of the anchoring lugs 47 and 49 and for this purpose the clutch shoe 20, on which the stop 45 is mounted, may be provided with openings 53 to receive the attached screws 54 on the opposite side of the shoe. This reversibility of the worktable enables the fixture to be used either on the right side or the left side of the saw. The rotative adjustment of the worktable may be limited by means of a stop 55 adjustably mounted in a graduated slot 56, the stop being engaged by a pin 61 selectively placed in one of a plurality of holes 60 provided in the rim of the worktable. This pin may extend outwardly beyond the positioning pin 44 so that the latter will clear the stop 55.

From the foregoing it will be observed that the workpiece is supported toward its central portion, in a manner to overhang the worktable and to extend into the path of the saw. To give proper support for the overhanging portion of the workpiece, while being sawed, a block 57 may be temporarily secured in place by a pair of clamps 58, the block having a slot 59 cut therein to facilitate its placement. The desired configuration consisting of a complete circle or a part thereof flanked by tangential lines may readily be imparted to the workpiece by a steadily guided movement throughout. By reason of this guided action it is possible to cut duplicates with precision. The worktable may form a part of the original manufacture of the machine, or it may be in the nature of a jig, fixture, or an attachment for machines now in use.

Should it be desired to saw workpieces of larger or smaller sizes which might necessitate the replacement of the worktable 9 by a table of greater or lesser diameter, the slide 7 may be provided with sets of openings 15, 51, as shown in Fig. 5, the slots 56' and 56'' being utilized for mounting the limit stop 55 when desired. Additional seats 33 are provided in the slide to be engaged by the catch 32 to cooperate with the proper one of the shoulders 30, 31 and the latch 29 for positioning the center of the turn table concentric with the graduated slots and opposite the saw. The use of a different sized turn table will also require adjustment of the bed frame member 5 from or toward the saw, and for this purpose the machine bed 1 is provided with slots 4' through which the screws 4 pass.

The fixture or attachment is applicable not only to band saw machines but also to shaping machines where it is desired to shape the marginal portion of the workpiece, in which instance the rotary cutter of the shaping machine will be located where the saw 3 is found. In utilizing the shaping machine the workpiece will be preliminarily cut out by the band saw and thereafter it will be placed on the turn table of the shaping machine, the impaling prongs 11 of the latter turn table being fitted into the recesses in the workpiece left by the impaling prongs of the work table on the band saw machine.

By use of the attachment a definite design composed of an arc with one or two tangents may readily be produced without the necessity of outlining the design in pencil or otherwise delineating the design on the workpiece prior to the sawing or shaping operation. In cases where several pieces of similar design and size are required it is therefore obvious that a considerable saving in time will be effected.

While the foregoing description has been given in detail it will be understood the construction described and shown herein is merely illustrative of the inventive principles involved, which may be applied to other physical embodiments without departing from the scope and spirit of the invention claimed.

What is claimed is:

1. A band saw fixture having a bed provided with a guideway and an adjacent saw, a slide mounted in the guideway for adjustment back and forth in a line substantially parallel to the plane of cut of the saw, a worktable rotatably mounted upon the slide, and stop means arranged to engage the slide during its movement in the guideway for arresting the slide in a position in which the axis of rotation for the worktable is opposite the saw whereby a workpiece on the worktable may be fed into the saw first by the movement of the slide in the guideway and second by the rotary movement of the worktable on the arrested slide.

2. A band saw fixture having a bed provided with a guideway and an adjacent saw, a slide mounted in the guideway for adjustment back and forth in a line substantially parallel to the plane of cut of the saw, a work table rotatably mounted upon the slide, means for locking the table against turning during the slide adjustment, and table positioning means automatically acting to arrest the slide in a predetermined position in which the worktable is to be unlocked for rotation, whereby a configuration embodying a straight line tangent to an arc may be produced.

3. A band saw machine having a bed provided with a guideway and an adjacent saw, a slide mounted in the guideway for adjustment back and forth in a line substantially parallel to the plane of cut of the saw, a worktable rotatably mounted upon the slide, means for locking the table against rotative adjustment during the slide adjustment, table positioning means automatically acting to arrest the slide in a position to dispose the axis of rotation for the table substantially in a plane normal to the plane of cut at the point of saw contact with a table supported workpiece whereby a workpiece on the worktable may be fed into the saw first by the movement of the slide in the guideway and second, when the worktable is unlocked, by the rotary movement of the worktable on the arrested slide, and means for rendering the slide arresting means inoperative for the continued adjustment of the slide within the guideway.

4. A band saw machine having a bed provided with a guideway and an adjacent saw, a slide mounted in the guideway for adjustment back and forth in a line substantially parallel to the plane of cut of the saw, a worktable rotatably mounted upon the slide, and table positioning means automatically acting to arrest the slide in a position to dispose the axis of rotation for the table substantially in a plane normal to the plane of cut at the point of saw contact with a table supported workpiece whereby a compound configuration embodying a straight line tangent to an arc may be produced.

5. A band saw machine having a bed provided with a guideway and an adjacent saw, a slide mounted in the guideway for adjustment back and forth in a line substantially parallel to the plane of cut of the saw, a worktable rotatably mounted upon the slide, means for locking the table during the slide adjustment, table positioning means automatically acting to arrest the slide in a position to dispose the axis of rotation for the table substantially in a plane normal to the plane of cut at the point of saw contact with a table supported workpiece whereby a workpiece on the worktable may be fed into the saw first by the movement of the slide in the guideway and second, when the worktable is unlocked, by the rotary movement of the worktable on the arrested slide, and means for restoring the worktable automatically to its normal position upon the slide when the workpiece is removed.

6. A band saw machine having a bed provided with a guideway and an adjacent saw, a slide mounted in the guideway for adjustment back and forth in a line substantially parallel to the plane of cut of the saw, a worktable rotatably mounted upon the slide, stop means for determining the extent of rotative adjustment of the worktable on the slide, and table positioning means automatically acting to arrest the slide in a position to dispose the axis of rotation for the table substantially in a plane normal to the plane of cut at the point of saw contact with a table supported workpiece whereby a workpiece on the worktable may be fed into the saw first by the movement of the slide in the guideway and second by the rotary movement of the worktable on the arrested slide.

7. A band saw machine having a bed provided with a guideway and an adjacent saw, a slide mounted in the guideway for adjustment back and forth in a line substantially parallel to the plane of cut of the saw, a worktable rotatably mounted upon the slide, means for locking the table during the slide adjustment, table positioning means automatically acting to arrest the slide in a position to dispose the axis of rotation for the table substantially in a plane normal to the plane of cut at the point of saw contact with a table supported workpiece whereby a workpiece on the worktable may be fed into the saw first by the movement of the slide in the guideway and second, when the worktable is unlocked, by the rotary movement of the worktable on the arrested slide, and means interposed between the worktable and the slide and acting to restore the worktable to its normal starting position on the slide upon removal of the workpiece.

8. A band saw machine having a bed provided with a guideway extending in the direction of the saw cut, a slide mounted in the guideway for adjustment back and forth, a worktable rotatably mounted upon the slide to enable an arcuate cutting when the slide is arrested, means for locking the table against rotation during the slide adjustment to enable a straight cutting, a convolute spring interposed between the worktable and the slide and acting automatically to restore the worktable to its normal starting position on the slide upon removal of the workpiece, said spring being detachably connected for reversal in mounting whereby the worktable may be adjusted clockwise or counterclockwise, and means for holding the slide arrested during the rotative adjustment of the table.

9. A band saw machine having a bed provided with a guideway extending in the direction of saw cut, a slide mounted in the guideway for adjustment back and forth for cutting in a straight line, a worktable rotatably mounted upon the slide for cutting in an arcuate line, a convolute spring mounting the worktable on the slide and acting after rotation of the worktable to restore the worktable to a predetermined position on the slide, and means for arresting the worktable in such predetermined position including a pin carried by the worktable and a yieldable stop on the slide normally engaged by the pin but retractible to permit turning of the table for tensioning the spring.

10. A band saw machine having a bed provided with a guideway, a slide mounted in the guideway for adjustment back and forth in a line substantially parallel to the plane of cut of the saw, a worktable rotatably mounted upon the slide, the slide having means for varying the location of the axis of rotation to accommodate work tables of different diameters, means for selectively arresting the slide to dispose the particular axis of rotation of the table in a plane normal to the plane of cut at the point of saw contact with a table supported workpiece whereby a workpiece on the worktable may be fed into the saw first by the movement of the slide in the guideway and second by the rotary movement of the worktable on the arrested slide, the bed having a plurality of arcuate slots of different radii one for each table, and an arresting stop selectively and adjustably mounted in the slots for engaging a stop on the selected worktable to determine the extent of rotative adjustment thereof.

11. A band saw machine having a bed provided with a guideway, a slide mounted in the guideway for adjustment back and forth in a line substantially parallel to the plane of cut of the saw, said slide having an arresting shoulder, a worktable rotatably mounted upon the slide, and means for holding the slide arrested during the rotative adjustment of the table, said slide-arresting means comprising a latch pivotally mounted on the bed and having an angularly extending arm, and a slidably mounted actuator having angularly related cam faces cooperating with the latch and its angularly extending arm during sliding movement of the actuator for controlling the rocking of the latch to project and withdraw the arm into and out of the path of the slide shoulder.

12. A band saw machine having a bed provided with a guideway, a slide mounted in the guideway for adjustment back and forth in a line substantially parallel to the plane of cut of the saw, said slide having an arresting shoulder, a worktable rotatably mounted upon the slide, and table positioning means automatically acting to arrest the slide in a position to dispose the axis of rotation for the table substantially in a plane normal to the plane of cut at the point of saw contact with a table supported workpiece whereby a workpiece on the worktable may be fed into the saw first by the movement of the slide in the guideway and second by the rotary movement of the worktable on the arrested slide, said table positioning means comprising a latch mounted on the bed for projection into the guideway to engage the shoulder, and an actuator operable to control the projection of the latch.

13. A band saw machine having a bed provided with a guideway, a slide mounted in the guideway for adjustment back and forth in a line substantially parallel to the plane of cut of the saw, said slide having an arresting shoulder, a worktable rotatably mounted upon the slide, and means for holding the slide arrested during the rotative adjustment of the table, said slide-arresting means comprising a latch pivotally mounted on the bed and having angularly related faces, a slidable actuator having spaced cam portions alternately engageable with the latch faces for controlling the pivoting of the latch.

14. A band saw machine having a bed provided with a guideway, a slide mounted in the guideway for adjustment back and forth in a line substantially parallel to the plane of cut of the saw, said slide having an arresting shoulder, a worktable rotatably mounted upon the slide, and means for holding the slide arrested during the rotative adjustment of the table, said slide-arresting means comprising a latch pivotally mounted on the bed and having an angularly extending arm, and a slidably mounted actuator having angularly related cam faces cooperating with the latch and its angularly extending arm during sliding movement of the actuator for controlling the rocking of the latch to project and withdraw the arm into and out of the path of the slide shoulder, the cam faces of the actuator being joined by an interposed face of a length substantially equal to that of the arm and each cam face bearing an angular relationship with the joining face similar to that between the latch body and its arm whereby the latch body and its arm may ride on a respective cam face to and from the joining face for operating the latch.

15. A band saw machine having a bed provided with a guideway, a slide mounted in the guideway for adjustment back and forth in a line substantially parallel to the plane of cut of the saw, said slide having an arresting shoulder, a worktable rotatably mounted upon the slide, means for holding the slide arrested during the rotative adjustment of the table, said slide-arresting means comprising a latch mounted on the bed for projection into the guideway to engage the shoulder, an actuator operable to control the projection of the latch, and means releasably engaging the slide to hold the same against retrograde movement from the latch.

GEORGES I. LAVOIE.